United States Patent
Rothe

(10) Patent No.: US 8,517,844 B2
(45) Date of Patent: Aug. 27, 2013

(54) TORQUE TRANSMITTING DEVICE

(75) Inventor: Joachim Rothe, Muehldorf (DE)

(73) Assignee: SGF Sueddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 68 days.

(21) Appl. No.: 13/130,794

(22) PCT Filed: Nov. 26, 2009

(86) PCT No.: PCT/EP2009/008439
§ 371 (c)(1),
(2), (4) Date: Aug. 10, 2011

(87) PCT Pub. No.: WO2010/060626
PCT Pub. Date: Jun. 3, 2010

(65) Prior Publication Data
US 2011/0306431 A1  Dec. 15, 2011

(30) Foreign Application Priority Data

Nov. 26, 2008 (DE) .......................... 10 2008 059 039
Sep. 9, 2009 (DE) .......................... 10 2009 040 727

(51) Int. Cl.
*F16D 3/223* (2011.01)
(52) U.S. Cl.
USPC ................................ 464/56; 464/76; 464/906
(58) Field of Classification Search
USPC .............. 464/55, 56, 69, 70, 76, 85, 140, 906
See application file for complete search history.

(56) References Cited

U.S. PATENT DOCUMENTS

| 987,878 A | * | 3/1911 | Hornby ...................... 464/69 X |
| 3,293,883 A | | 12/1966 | Boschi et al. |
| 4,118,952 A | * | 10/1978 | Kobayashi ...................... 464/69 |
| 8,167,726 B2 | * | 5/2012 | Wormsbaecher et al. .... 464/906 |

FOREIGN PATENT DOCUMENTS

| DE | 4116841 A1 | 11/1992 |
| DE | 102007031078 A1 | 1/2008 |
| DE | 102007031079 A1 | 1/2008 |
| DE | 102006049665 A1 | 4/2008 |
| EP | 0 67 654 A1 * | 1/1986 |
| EP | 1 710 459 A1 | 10/2006 |
| GB | 731 081 A | 6/1955 |
| GB | 1 061 279 A | 3/1967 |
| GB | 2 028 968 A | 3/1980 |
| GB | 2 347 730 A | 9/2000 |
| WO | 2008/003303 A1 | 1/2008 |
| WO | WO 2008/123877 A1 * | 10/2008 |

OTHER PUBLICATIONS

International Search Report for Appln. No. PCT/EP2009/008439 mailed Mar. 16, 2010.

* cited by examiner

*Primary Examiner* — Gregory Binda
(74) *Attorney, Agent, or Firm* — Carter Deluca Farrell & Schmidt LLP

(57) ABSTRACT

A torque transmitting device comprises a vibration damping unit for damping torsional vibrations, said unit having at least two transmission parts, wherein one of the transmission parts is assigned to one of the shaft sections and the other transmission part is assigned to the articulated arrangement, and wherein the transmission parts each have segment formations with radial or axial segment sections, which interact in a torque-transmitting manner with one another in a transmission area, wherein at least one damper arrangement is provided between neighboring segment sections in the transmission area.

6 Claims, 13 Drawing Sheets

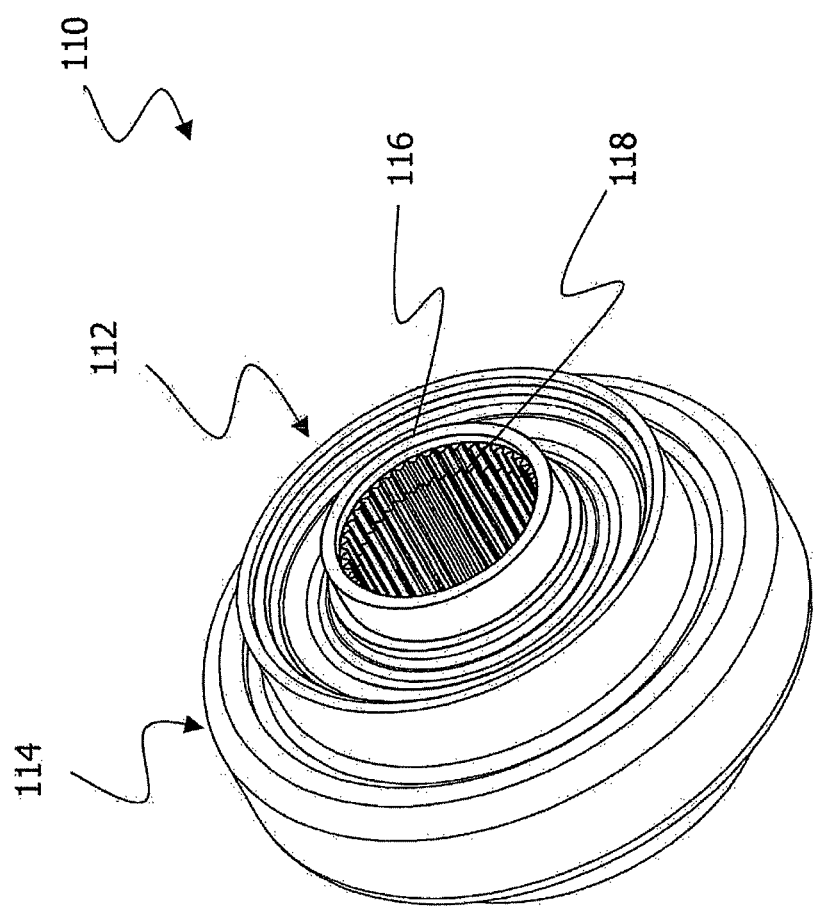

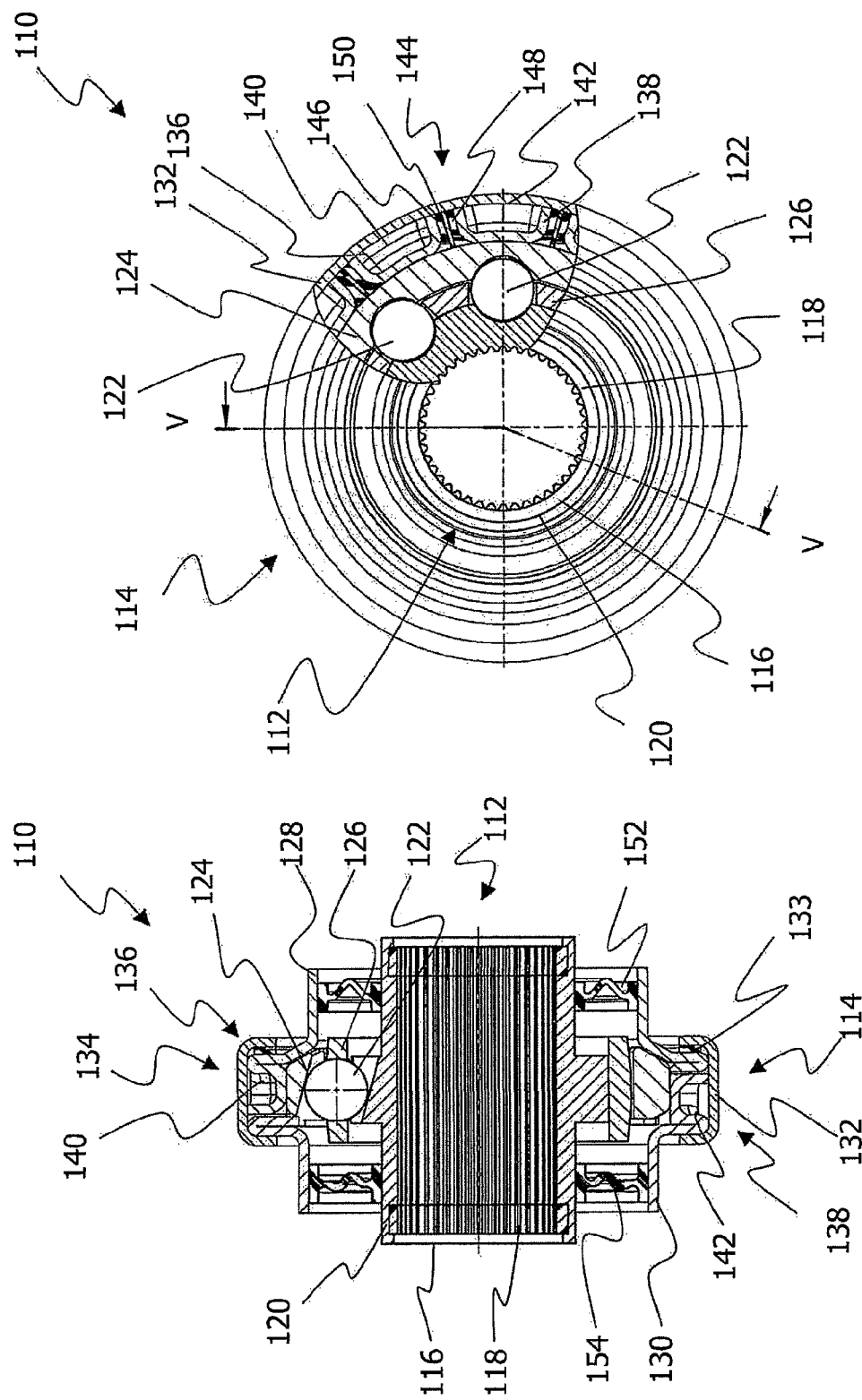

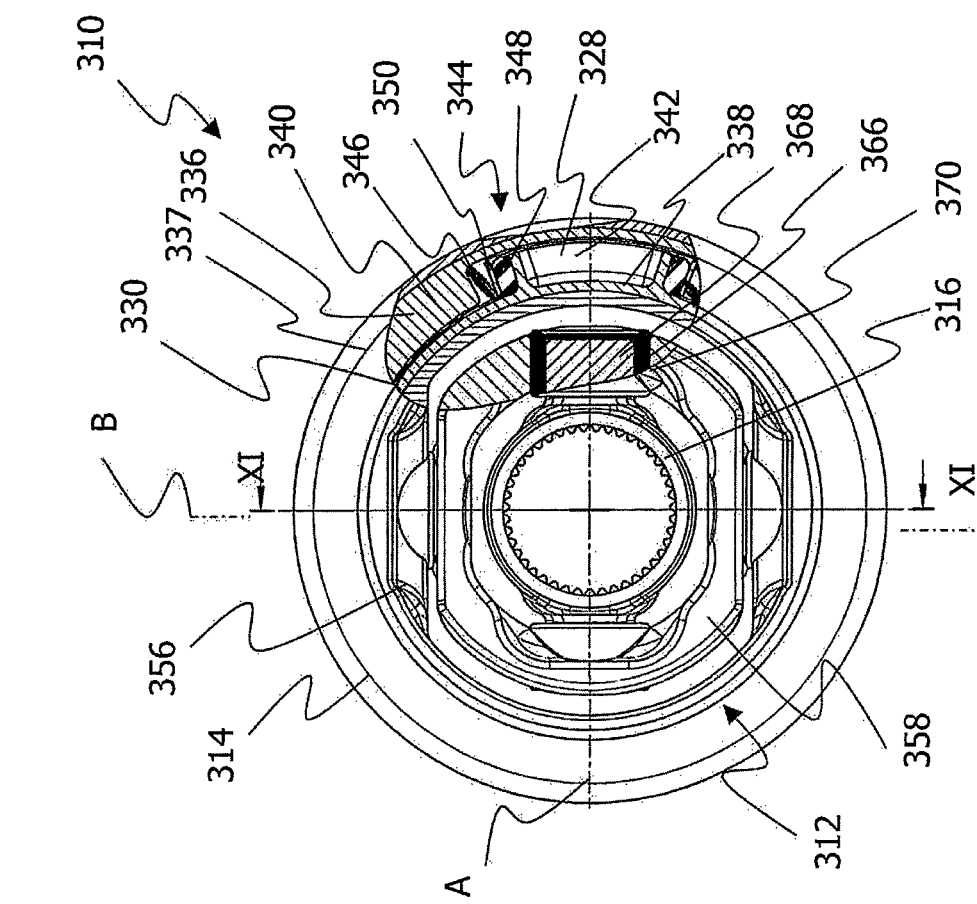
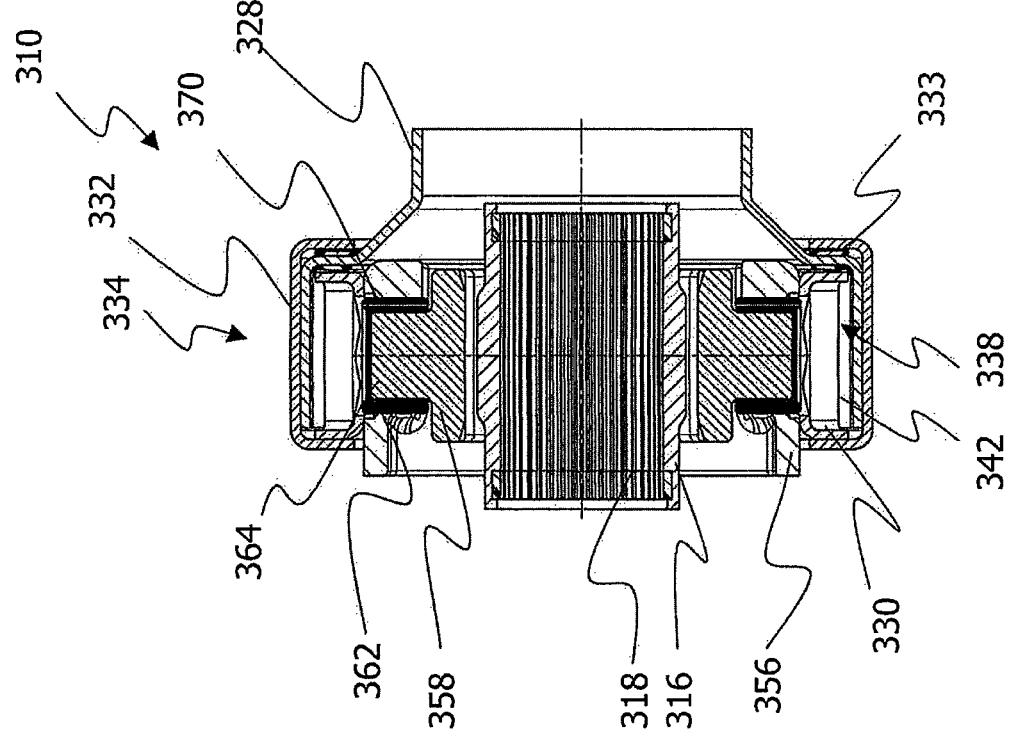
Fig. 11
Fig. 12

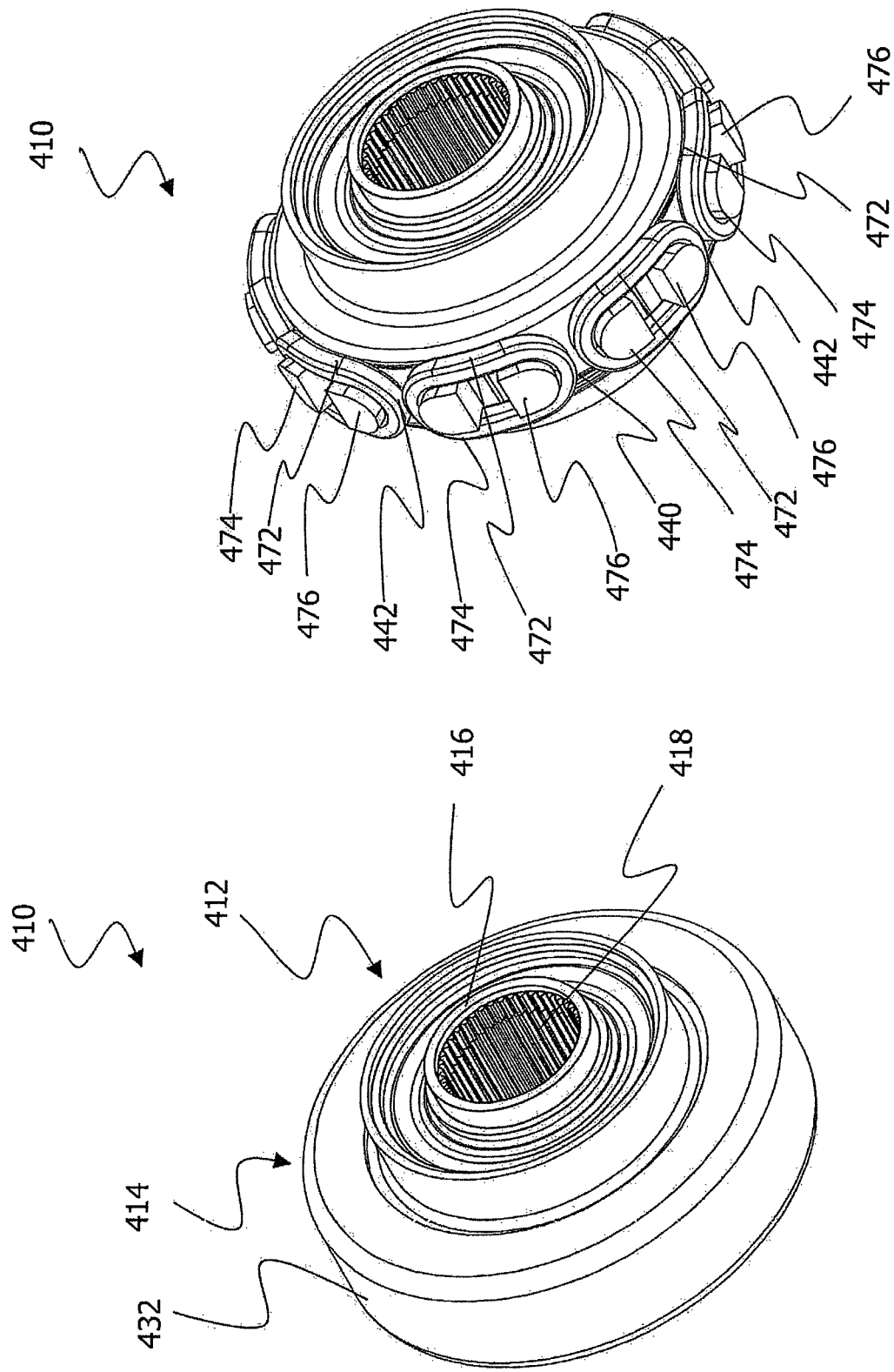

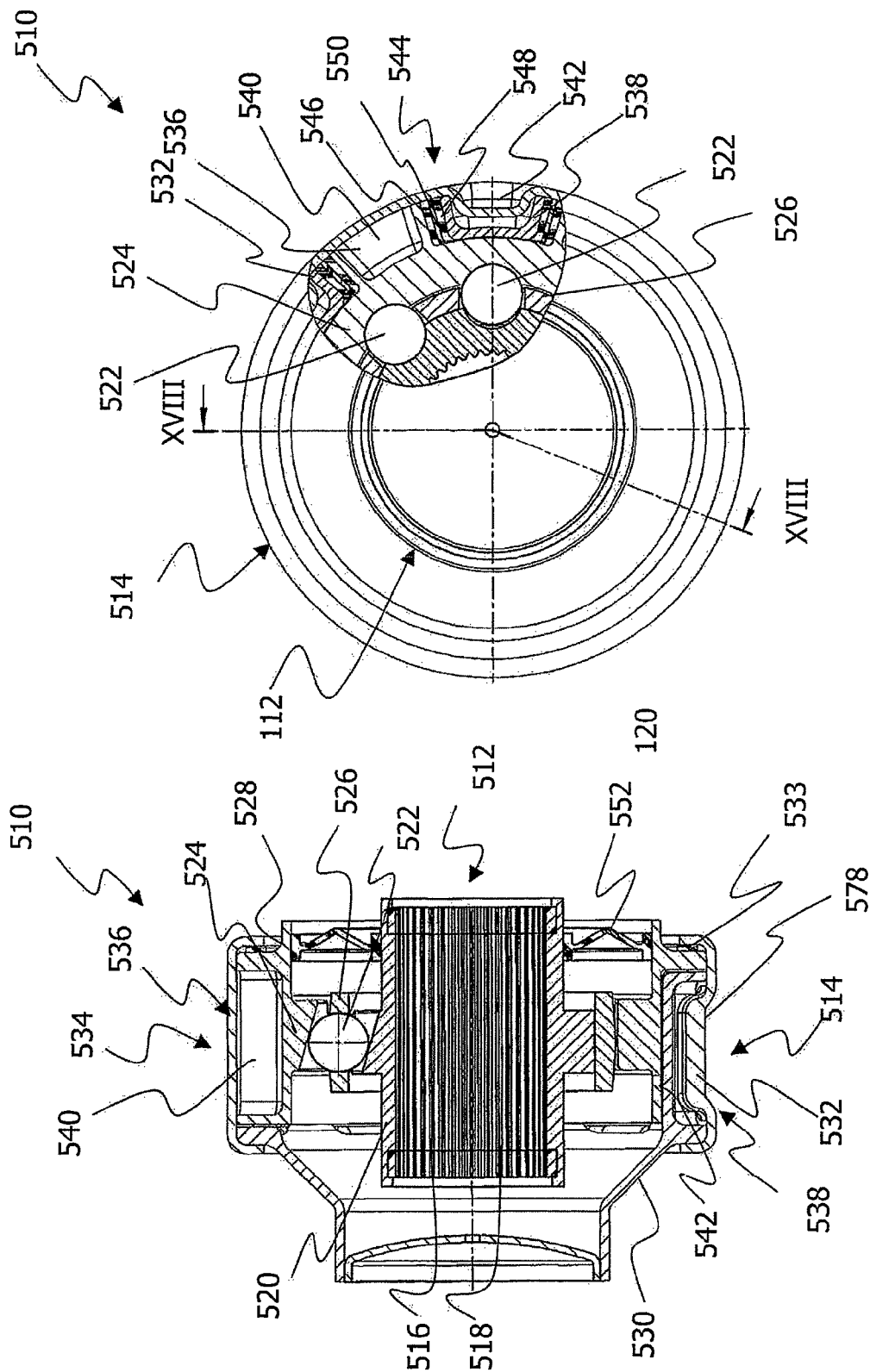

TORQUE TRANSMITTING DEVICE

TECHNICAL FIELD

The present invention relates to a torque transmitting device for transmitting torques between two shaft sections of a shaft arrangement by way of an articulated arrangement, wherein the articulated arrangement is designed to compensate for an angular offset between the shaft sections.

BACKGROUND

Such devices are known from the background art in the form of universal joints or ball joints, such as for example fixed ball joints, ball-type constant velocity joints and homokinetic joints.

Conventional universal joints comprise two joint forks, which are connectable in each case to a shaft and to one another by a joint part. Universal joints are customarily used in shaft arrangements where torques are transmitted via a plurality of shafts that do not run parallel and/or extend offset by an optionally variable angle to one another. A particular application of universal joints is in articulated shafts for transmitting input forces and steering forces in motor vehicles.

In addition to the above-mentioned universal joints, fixed ball joints are moreover also known from the background art for connecting two shaft sections that do not run parallel, i.e. extend offset by an angle to one another. For example, the documents DE 10 2007 031 078 A1 and DE 10 2007 031 079 A1 disclose ball-type constant velocity fixed joints for input shaft arrangements. These two documents, which from the disclosure content in this respect are extensively identical, disclose ball-type constant velocity fixed joints, in which provided between a joint inner part and a joint outer part are balls that transmit the torque between joint inner part and joint outer part. A type of cage is used to guide the balls. Formed for torque transmission in the joint inner part is longitudinal gearing, into which a shaft section having suitably corresponding external gearing may be inserted.

Such universal joints and fixed ball joints, whilst they fulfil the task of connecting together two shaft sections that are offset at an angle to one another, are unable to meet the current demands for a coupling of two shaft sections that simultaneously damps torsional vibrations. In particular, such joints and/or coupling devices are required to transmit the torques with minimum loss from one shaft section to the other shaft section, but damp vibrations, and in particular torsional vibrations that arise, sufficiently to prevent structure-borne noise that arises for example at the input axle from being transmitted through the vehicle.

In addition to the previously described articulated arrangements in the form of ball joints and universal joints the prior art also includes ball joints that are provided with a damping device. Such a joint is disclosed for example in EP 1 710 459 A1. The articulated arrangement according to EP 1 710 459 A1 that is designed for a steering shaft comprises an outer part in the form of a joint bell, which is associated with a shaft section. An inner part forms a housing part of the ball joint that is connected to a second shaft section. Between the outer part and the semicircular inner part disposed therein an elastic damping layer is provided. The inner part has outwardly oriented projections. The outer part has inwardly oriented projections corresponding to the projections of the inner part. The projections of the outer part and the projections of the inner part engage into one another for torque transmission. The damping layer disposed between the outer part and the inner part connects the projections of the outer part and the inner part to one another.

The elastic damping layer attached to the radial faces of the projections of the inner part and to the corresponding faces of the projections of the outer part, i.e. the damping layer that connects the outer part and the inner part, is subject to high shear stress at these radial faces. In other words, the elastic layer during torque transmission by means of this articulated arrangement, which takes up a relatively large amount of installation space in axial direction, may be sheared off either from the inner part or from the outer part, thereby rendering the function of the articulated arrangement, namely the damping of vibrations, impossible.

DE 41 16 841 A1 discloses an articulated connection between an input bevel gear and an articulated shaft that comprises a flange of a two-part construction. The flange consists of a first flange part, which is associated with the input bevel gear, and a second flange part, which is associated with the articulated shaft. The second flange part is configured as an inner ring that is concentrically surrounded with radial clearance by the first flange part fashioned as an outer ring. The connection of the second flange part to the articulated shaft is effected by means of a homokinetic joint. The second flange part is connected to the homokinetic joint by a screw connections. A torque is transmitted from the articulated shaft to the input bevel gear via the elastic intermediate layer disposed between the two flange parts. The first flange part for this purpose has internal gearing, and on the inner ring of the second flange part corresponding external gearing is formed.

In this articulated arrangement also, the elastic intermediate layer is subject to extreme shear stress, this leading during torque transmission to a shearing-off of the intermediate layer either at the outer ring of the first flange part or at the inner ring of the second flange part and having a negative influence on both the function and the service life of the articulated arrangement. The articulated arrangement according to DE 41 16 841 A1 is moreover of a relatively complex construction with a large number of individual parts. For instance, here a radially outer component of the homokinetic joint is screw-connected to the inner second flange part. The large number of individual parts and the screw connection between the homokinetic joint and the flange part considerably increase the fault liability of this articulated arrangement.

It is an object of the present invention is to provide a torque transmitting device for transmitting torques of the type described in the introduction, which while being of a compact design is simultaneously capable of damping vibrations and transmitting high torques and which both avoids the previously described problems of prior art and also prolongs the service life.

SUMMARY

This object is achieved by a torque transmitting device of the type described in the introduction, wherein the torque transmitting device comprises a vibration damping unit for damping torsional vibrations, said unit having at least two transmission parts, wherein one of the transmission parts is assigned to one of the shaft sections and the other transmission part is assigned to the articulated arrangement, and wherein the transmission parts each have segment formations with radial segment sections, which interact in a torque-transmitting manner with one another in a transmission area, wherein at least one damper arrangement that is substantially subject to compressive stress is provided between neighbouring segment sections in the transmission area.

With the torque transmitting device according to the invention it is possible not only to compensate angular offsets between two shaft sections to be connected but also to damp torsional vibrations that arise during operation of a drive train. By virtue of the assignment of one of the transmission parts to one shaft section and of the other transmission part to the articulated arrangement and the segment formations with radial segment sections, the torque transmitting device according to the invention takes up relatively little installation space, which particularly in the region of a drive train of a motor vehicle is available only to a very limited extent. In other words, with the extremely compact torque transmitting device according to the invention angular offsets may be compensated and at the same time torsional vibrations may be damped, with the result that torques are transmitted almost without loss and a transmission through the vehicle of structure-borne noise arising at the input axle is avoided. By virtue of the development according to the invention comprising segment formations that engage one into the other and damper arrangements disposed therebetween it is possible to achieve the effect whereby the damper arrangement are almost exclusively subject to compressive stress, thereby prolonging the service life of the device according to the invention. Shear stresses, such as arise in the prior art and shorten the service life, are avoided by the device according to the invention.

In order to enable reliable and substantially loss-free transmission of torques with simultaneous damping of torsional vibrations, a development of the invention provides that the segment formations of the at least two transmission parts may be brought into engagement with one another in radial direction for torque transmission. In other words, the segment sections of the segment formations for torque transmission engage into and/or act upon one another, with the result that high torques may be transmitted without loss.

According to the invention two neighbouring segment sections, of which one is assigned to the one transmission part and the other to the respective other transmission part, are connected to one another. In this case it is conceivable for example for the two transmission parts to be connected to one another by the damper arrangement, wherein the damper arrangement in the event of load is subject only to compressive load.

According to an embodiment of the invention it is provided that the neighbouring segment sections are connected in pairs by means of at least one deformable loop. In other words, in this embodiment the torques are transmitted not only via a mutual engagement of the segment sections of the transmission parts (compressive load) but also via a connection between two neighbouring segment sections by means of loop subject to tensile load. In other words, in this constructional variant the torques are transmitted via a tensile force and a compressive force from the one transmission part, which is driven, to the respective other output-side transmission part.

In connection with the embodiment described above it may be provided, with regard to the structural design of the segment sections, that these have at least two projections, around which in each case a loop is wrapped to connect one of the segment sections of one segment formation to a neighbouring segment section of the respective other segment formation.

According to the invention the loop may be manufactured from rubber and/or a thread layer, preferably from a rubber with a thread insert.

According to an embodiment of the invention one of the transmission parts in the transmission area has a segment formation with radially inwardly oriented segment sections and the respective other transmission part has a segment formation with radially outwardly oriented segment sections, wherein the segment formations are in engagement with one another. In other words, the transmission parts may be disposed one radially above the other, wherein the one radially outer transmission part has the inwardly oriented segment sections and the radially inner transmission part has the outwardly oriented segment sections.

According to a development of the invention it may be provided that the damper arrangement at least partially surrounds the segment formations in the transmission area. The segment sections of the segment formations are accordingly surrounded by the damper arrangement, which during the torque transmission is elastically deformed by the mutually engaged segment sections until the individual neighbouring segment sections lie virtually adjacent to one another. In other words, as the amount of the torques to be transmitted increases, the damper arrangement is elastically deformed to a greater extent, with the result that a progressive damping characteristic is achieved.

With regard to the damper arrangement, according to the invention it may further be provided that this comprises at least one damping material layer, in particular a rubber layer or a plastics material layer between the segment formations of the transmission parts that may be brought into engagement with one another.

As an alternative to a damper arrangement comprising a damping material layer, the damper arrangement according to the invention may be of a multilayer construction, wherein next to the at least one damping material layer a least one layer of a further material is disposed. In this connection it should be mentioned that the segment sections of a segment formation are coated with a damping material layer, wherein between the segment formations coated with a damping material layer a further material layer, in particular a plastics material layer, may be provided.

In order to accommodate one of the shaft sections in an axially displaceable manner in the articulated arrangement of the torque transmitting device yet still enable reliable transmission of torques by means of the torque transmitting device, according to a preferred embodiment of the invention it is provided that the articulated arrangement has a location opening with internal profiling, preferably internal gearing, for the rotationally fixed connection to one of the shaft sections, wherein the shaft section assigned to the respective internal profiling has corresponding external profiling, in particular external gearing, and wherein the shaft section with the external profiling is accommodated in an axially displaceable manner in the location opening with internal profiling. In other words, the torques to be transmitted are transmitted by means of a positive engagement between the internal profiling of the location opening of the articulated arrangement and the external profiling corresponding thereto of one of the shaft sections, with the result that the corresponding shaft section is accommodated in the articulated arrangement displaceably in order to compensate axial movements.

In order to protect the torque transmitting device and/or the vibration damping unit of the torque transmitting device from dirt and water penetration, according to an embodiment of the invention it is provided that the at least two transmission parts in the transmission area are surrounded by a housing, which is connected to at least one of the transmission parts.

Since installation space particularly in the drive train of a motor vehicle is available only to a limited extent, the vibration damping unit according to an embodiment at least partially surrounds the articulated arrangement.

According to the invention the vibration damping unit may be disposed on the outer circumference of the articulated arrangement. Because of the only limited amount of installation space available, particularly in axial direction of the drive train of a motor vehicle, the vibration damping unit is disposed preferably radially on the outside of the articulated arrangement, with the result that the installation space taken up by the articulated arrangement remains almost the same or is only insignificantly increased in radial direction by the vibration damping arrangement.

According to an embodiment of the invention the articulated arrangement is a fixed ball joint. In order to be able to mount the vibration damping unit on the outer circumference of the articulated arrangement, according to an embodiment of the invention the vibration damping unit is connected in a rotationally fixed manner to a housing part of the fixed ball joint.

According to an embodiment of the invention the transmission parts for torque transmission receive one another in an axially overlapping manner in the coupling area, wherein one of the shaft sections is accommodated in an axially displaceable manner in the fixed ball joint.

By virtue of the arrangement of the fixed ball joint on the torque transmitting device it is possible not only to compensate angular offsets between two shaft sections that are to be connected but also by virtue of the axially displaceable accommodation of one of the shaft sections in the fixed ball joint to compensate axial aggregate movements caused by the impacts and shocks arising in the drive train of a motor vehicle, thereby prolonging the service life of the joint itself and the transmitting device connected thereto and of the downstream components. In other words, the shaft section that is accommodated in the fixed ball joint may move in axial direction to compensate axial aggregate movements in the fixed ball joint, thereby preventing the impacts and shocks from acting upon the joint and the transmitting device.

A fixed ball joint comprises an internal hub, which may be configured in the form of a ball star, for fastening and/or receiving one of the shaft sections. A preferred embodiment of the invention therefore provides that the location opening with internal profiling is formed in the ball star. In this connection it should further be mentioned that the ball star according to an embodiment of the invention is coupled in a torque-transmitting manner to the housing of the fixed ball joint by a ball arrangement, wherein the balls are disposed in such a way that the ball star and the shaft section that is axially displaceable in the location opening are displaceable relative to the longitudinal axis of the other shaft section. The ball arrangement enables a torque transmission between two shaft sections that are offset by an angle of up to 40° relative to one another.

To prevent dirt and lubricant residues from penetrating into the fixed ball joint, a development of the invention provides that shielding elements, in particular of rubber, are provided between the ball star and housing parts of the fixed ball joint.

For transmitting a torque via the torque transmitting device and the homokinetic joint connected thereto, according to a preferred embodiment of the invention it is provided that the fixed ball joint is connected in a rotationally fixed manner, preferably welded or press-fitted, to one of the transmission parts and the other section is connected in a fixed manner to the other transmission part.

In order to achieve a particularly simple torque transmitting device that is inexpensive to manufacture and simultaneously meets the current requirements regarding vibration damping, a further embodiment of the invention provides that the two transmission parts in the coupling area are of a substantially uniform construction, wherein the transmission parts are provided in each case with a damper device, preferably a rubber layer.

According to the invention it may further be provided that a positioning pin is provided between the transmission parts in the coupling area, wherein the device is axially braceable by means of the positioning pin. Such a positioning pin may position the two transmission parts in the coupling area relative to one another, in particular align them with regard to the longitudinal axis substantially coaxially with one another. The positioning pin may, albeit to a limited extent, perform a kind of articulation function if the two transmission parts during operation extend, not coaxially, but offset or at an angle relative to one another.

An embodiment of the invention further provides that the articulated arrangement is a universal joint. In order, in this embodiment comprising a universal joint as an articulated arrangement, to take up as little installation space as possible particularly in axial direction in a drive train, the vibration damping unit according to an embodiment of the invention is disposed on the outer circumference of the universal joint at least partially in a plane that is defined by joint axes of the universal joint.

According to the invention the segment formations are manufactured by deep-drawing, forging or cutting methods.

The invention further relates to a shaft arrangement having a torque transmitting device of the previously described type.

BRIEF DESCRIPTION OF THE DRAWINGS

There now follows a description of the invention by way of example with reference to the accompanying figures. These show:

FIG. 4 a perspective view of a torque transmitting device according to a second embodiment of the invention;

FIG. 5 a partially broken-open front view of the torque transmitting device according to the second embodiment of the invention;

FIG. 6 a sectional view along the cutting line V-V of FIG. 5;

FIG. 11 a partially broken-open front view of the torque transmitting device according to the fourth embodiment of the invention;

FIG. 12 a sectional view along the cutting line XI-XI of FIG. 11;

FIG. 13 a perspective view of a torque transmitting device according to a fifth embodiment;

FIG. 14 a perspective view of the torque transmitting device according to the fifth embodiment without the housing;

FIG. 18 a partially broken-open front view of the torque transmitting device according to the sixth embodiment;

FIG. 19 a sectional view along the cutting line XVI-XVI of FIG. 18.

DETAILED DESCRIPTION

Figure 1:
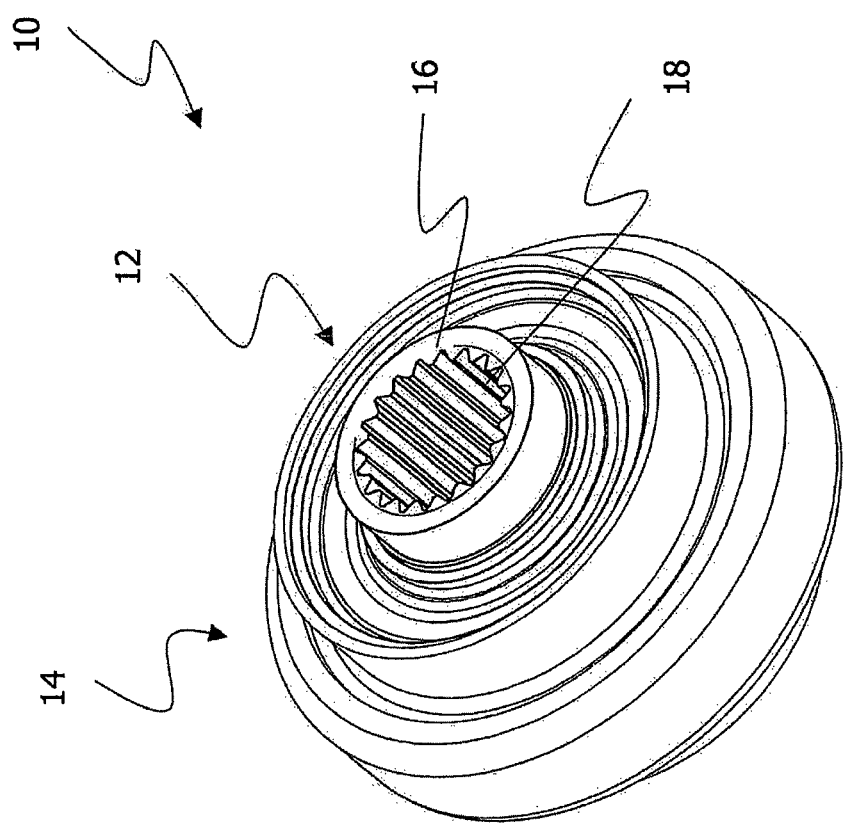
FIG. 1 a perspective view of a torque transmitting device according to a first embodiment of the invention.
Figure 2:
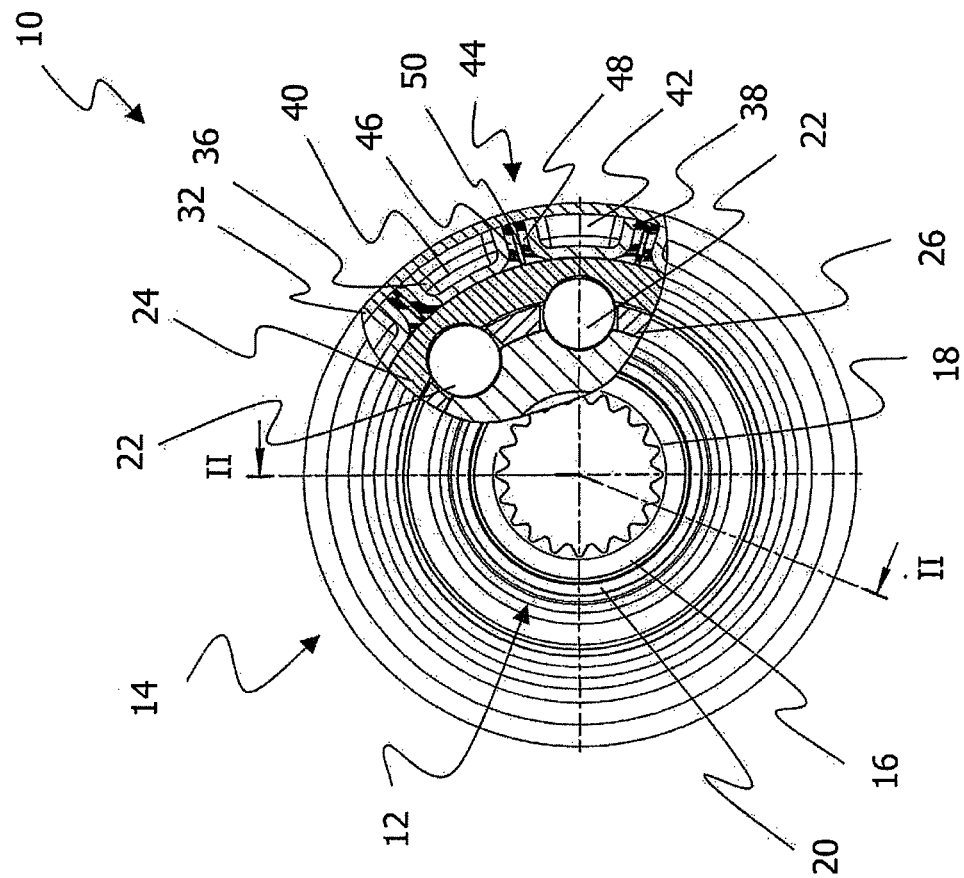
FIG. 2 a partially broken-open front view of the torque transmitting device according to the first embodiment of the invention.
Figure 3:
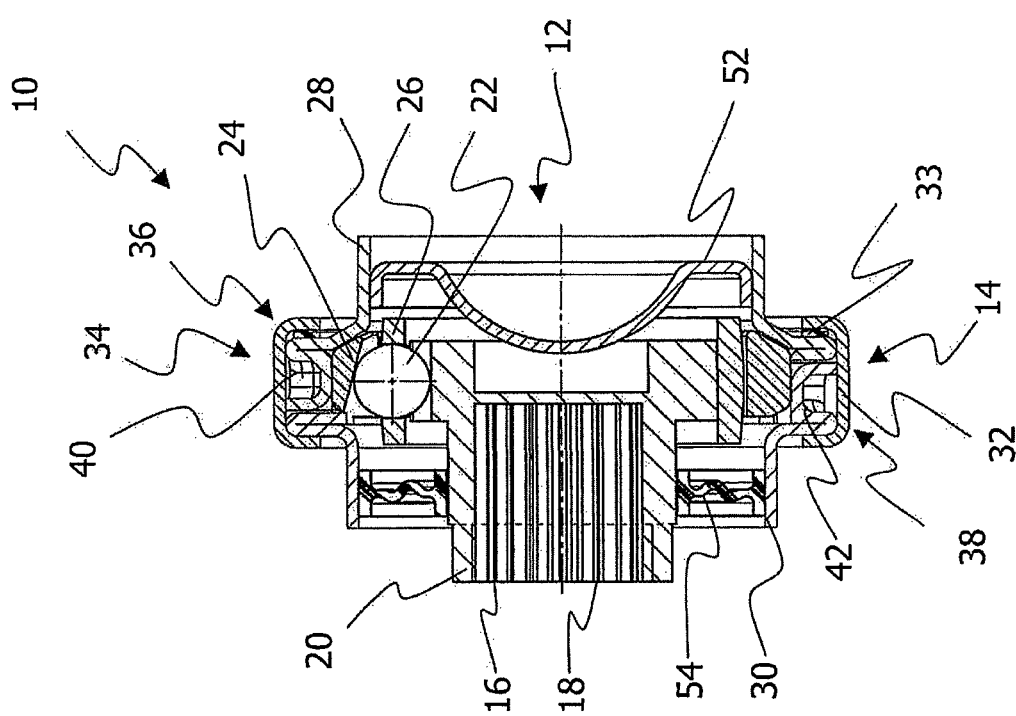
FIG. 3 a sectional view along the cutting line II-II of FIG. 2.

FIG. 1 shows a perspective view of the torque transmitting device 10 according to the first embodiment of the invention. From FIG. 1 it may be seen that the torque transmitting device 10 comprises an articulated arrangement 12, which is surrounded at its outer circumference by a vibration damping unit 14 (FIGS. 2 and 3). The articulated arrangement 12 according to the first embodiment of the invention 10 is a fixed ball joint, which is described in detail with reference to FIGS. 2 and 3. For receiving a shaft section (not shown here) the torque transmitting device 10 and/or the fixed ball joint 12 has a location opening 16 with internal profiling 18.

FIG. 2 shows a partially broken-open front view of the torque transmitting device 10 according to the first embodiment of the invention and FIG. 3 shows a sectional view along the cutting line II-II of FIG. 2.

By looking at and comparing FIGS. 2 and 3 it is evident that the articulated arrangement 12 is configured in the form of a fixed ball joint, on the outer circumference of which in radial direction the vibration damping unit 14 is disposed. The fixed ball joint 12 comprises an internal hub 20 in the form of a ball star, in which the location opening 16 is provided. In the location opening 16 the internal profiling 18, preferably in the form of internal gearing, is formed. The internal gearing 18 is manufactured preferably by broaching or milling, i.e. by means of low-cost but highprecision operations. The ball star 20 in its outer circumferential surface has troughs, in which balls 22 are accommodated. By these balls 22 the ball star 20 is coupled in a torque-transmitting manner to a housing part 24. By virtue of the balls 22 being guided in a cage 26 disposed between the ball star 20 and the housing part 24 angular offsets of up to 40° between two shaft sections (not shown) that are to be connected may be compensated by means of the device 10.

From FIG. 3 it is further evident that the vibration damping unit 14 comprises two transmission parts 28 and 30, of which the transmission part 30 is connected in a fixed manner to the housing part 24 of the fixed ball joint 12. The two transmission parts 28 and 30 are at least partially surrounded by a housing 32. The transmission part 28 is connected by a friction-reducing plastic ring 33 in a relatively rotatable manner to the housing 32, whereas the transmission part 30 is connected in a rotationally fixed manner to the housing 32. It is also conceivable to design the housing part 24 and the transmission part 30 as one part, for example in the form of a part manufactured by forging.

As is further evident from a combined viewing of FIGS. 2 and 3, the transmission parts 28 and 30 overlap in a transmission area 34 in axial direction, wherein in this transmission area 34 they have corresponding segment formations 36 and 38. The segment formations 36 and 38 each comprise a plurality of segment sections, of which only the segment section 40 of the segment formation 36 and the segment section 42 of the segment formation 38 are shown in FIG. 2. FIG. 3 again shows the segment section 40 of the segment formation 36 of the transmission part 28 as well as the segment section 42 of the segment formation 38 of the transmission part 30.

Provided between the individual segment sections 40, 42 is a damper arrangement 44 (FIG. 2), which is substantially subject to compressive load and at least partially surrounds the segment formations 36 and 38. The damper arrangement 44 is of a multilayer construction, i.e. the individual segment formations 36 and 38 are coated with a damping material layer 46 and 48, preferably a rubber layer, and between these two layers 46 and 48 a further material layer 50, preferably of plastics material, is provided.

During operation of the torque transmitting device 10, the transmission part 28 for example is driven by a motor-side shaft section connected to this transmission part 28, with the result that the segment formation 36 of the transmission part 28 is displaced with simultaneous elastic deformation of the damper arrangement 44 relatively in the direction of the segment formation 38 of the transmission part 30. In other words, by means of the mutually engaged segment sections 40, 42 of the transmission parts 28, 30 the material layers 46, 48 and 50 of the damper arrangement 44 are elastically deformed under compressive load until the individual neighbouring segment sections 40, 42 lie almost adjacent to one another, i.e. the higher the torque to be transmitted is, the more the damper arrangement is elastically deformed. As the transmission part 30 is connected in a rotationally fixed manner to the housing part 24 of the fixed ball joint 12, the torque is transmitted via the trans-mission part 30 to the fixed ball joint 12 and hence via the internal gearing 18 to a shaft section (not shown) in the location opening 18.

Thus, even very high torques may be transmitted substantially without loss by the torque transmitting device 10. Furthermore, by means of the material layers 46, 48 and 50 a specific damping characteristic may be achieved, i.e. the damper arrangement 44 may be adjusted to specific vibration frequencies. The vibration damping unit 14 accordingly by means of the damper arrangement 44 between the segment formations 36 and 38 of the transmission parts 28 and 30 damps the vibrations and torsional vibrations arising in a drive train sufficiently to prevent a structure-borne noise that arises at the input shaft from being transmitted through the vehicle, wherein torques are transmitted substantially directly between the two shaft sections. The segment formations 36, 38 according to the first embodiment of the invention are manufactured preferably by means of a deep-drawing method, with the result that because of the relatively thin material cross sections a lightweight vibration damping unit 14 is achieved, which adds only slightly to the weight of a conventional fixed ball joint 12.

From FIG. 3 shielding elements 52 and 54 are further evident. The shielding element 52 extends over the entire inside diameter of the transmission part 28, whereas the shielding element 54 manufactured from rubber is provided between the ball star 20 and the transmission part 30. The shielding elements 52 and 54 are to prevent lubricant residues or particles possibly abraded by friction from being able to penetrate into the fixed ball joint 12 or migrate from the fixed ball joint 12 out in the direction of other components of a drive train in a motor vehicle.

FIGS. 4 to 6 show a second embodiment of the invention, which is relatively similar to the embodiment according to FIGS. 1 to 3. To avoid repetition and simplify the description of the various embodiments, for components of an identical type or function a consecutive number is placed in each case in front of the reference characters of the individual embodiment.

The embodiment according to FIGS. 4 to 6 differs from the first embodiment according to FIGS. 1 to 3 merely in that the internal hub and/or the ball star 120 of the fixed ball joint 112 has a location opening 116 in the form of a through-bore. In the through-bore 116 internal profiling 118 in the form of internal gearing is formed.

It is further evident from FIG. 6 that according to the second embodiment both shielding elements 152 and 154 are formed from rubber and the shielding element 152 is disposed between the ball star 120 and the transmission part 128. Otherwise, all of the components are comparable to the corresponding components of the first embodiment according to FIGS. 1 to 3, for which reason in order to avoid repetition a detailed description of these components is not provided.

There now follows a detailed functional description of the torque transmitting device 110.

In the location opening 116 having the internal profiling 118 a shaft section (not shown here) having external gearing corresponding to the internal gearing 116 is accommodated in an axially displaceable manner, whereas the other shaft section is connected in a fixed manner to the transmission part 128. By means of the fixed ball joint and/or the torque-transmitting coupling of the ball star 120 by means of the balls 22 to the housing part 124, torques may be transmitted via the two shaft sections, which possibly extend at an angle to one another. During operation, by means of a positive engagement between the internal gearing 118 and the external gearing of the shaft section torques are transmitted. At the same time, this connection between the internal gearing 118 and the corresponding external gearing also enables, in addition to torque transmission, the compensation of axial aggregate movements by means of the shaft section that is displaceable in the location opening 116. These axial aggregate movements therefore have no effect upon the torque transmitting device 110 and/or the fixed ball joint 112 or upon the downstream components in a drive train. The function of the damping unit 114 is identical to the function of the damping unit 14 that was described in detail with reference to the embodiment according to FIGS. 1 to 3.

A third embodiment of the torque transmitting device is described with reference to FIGS. 7 to 9. To avoid repetition, for components of an identical type or function the same reference characters, only prefixed by the numeral "2", are used.

Figure 7:
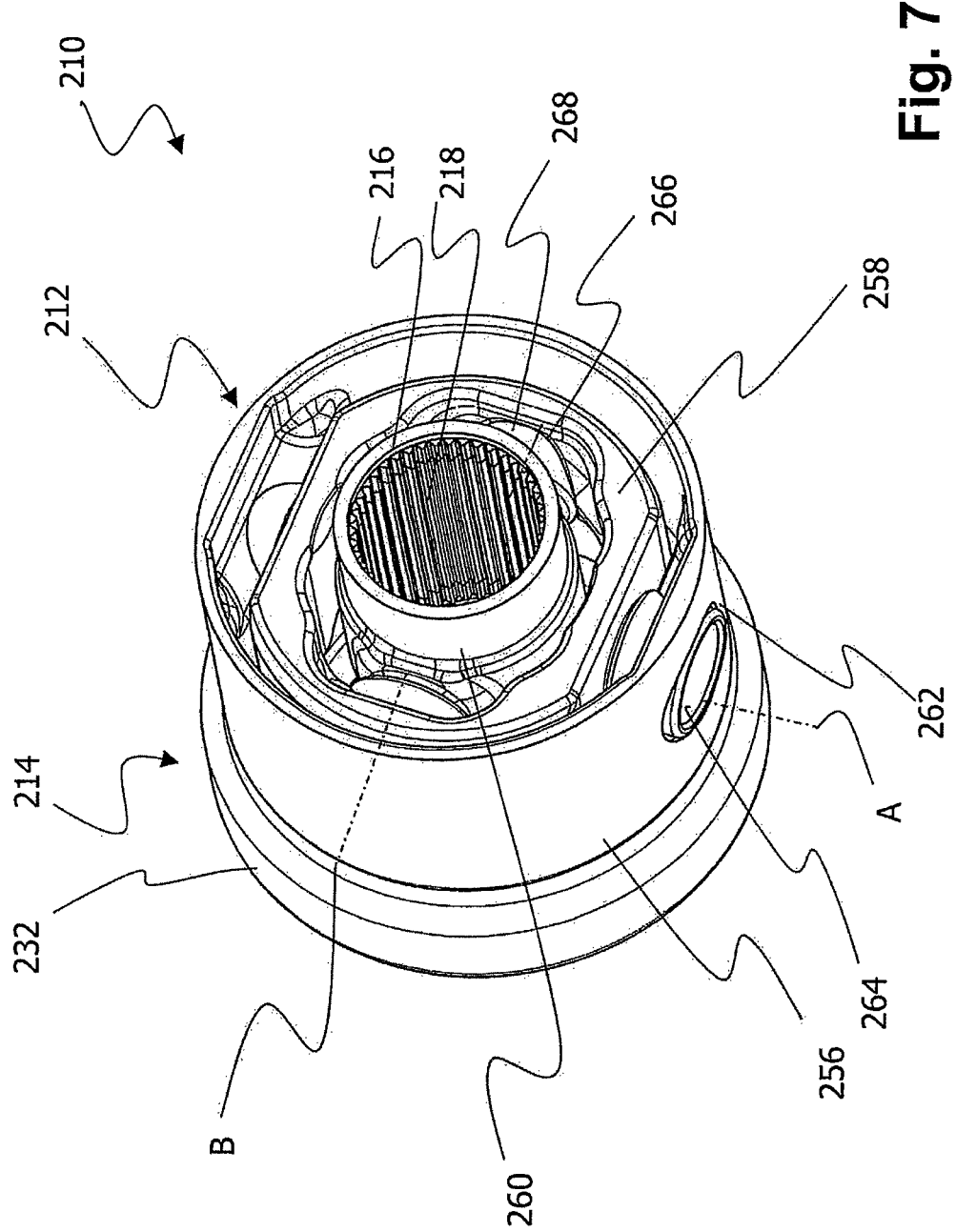
FIG. 7 a perspective view of a torque transmitting device according to a third embodiment of the invention.

FIG. 7 shows a perspective view of the torque transmitting device 210 according to the third embodiment of the invention. From FIG. 7 it is evident that the articulated arrangement 212 according to the third embodiment is a universal joint. On an axial end of the universal joint 212 the vibration damping unit 214 is disposed.

The universal joint 212 comprises an outer joint part 256, also known as a joint fork, and an intermediate element 258, which is disposed in this joint part 256 and in which in turn the joint inner part 260 is disposed. In the joint fork 256 bearing openings 262 are formed, through which the intermediate element 258 may be coupled to the joint fork 256 by bearing bolts 264 that correspond to the bearing openings 262. The intermediate element 258 has a pair of bearing openings 266, which are offset relative to this pair of bearing bolts 264 and through which the joint inner part 260 may be coupled to the intermediate element 258 by bearing bolts 268 that correspond to the bearing openings 266. The bearing openings 262 of the joint fork 256 and the bearing bolts 264 corresponding thereto of the intermediate element 258 define a first joint axis A, and the bearing openings 266 of the intermediate element 258 together with the bearing bolts 268 of the joint inner part 260 define a second joint axis B. The two joint axes A, B extend through the intermediate element 258.

FIG. 7 further shows, as in the embodiments according to FIGS. 1 to 5, a location opening 216 formed in the joint inner part 260 as well as internal profiling 218 formed in the location opening 216.

Figures 8, 9:
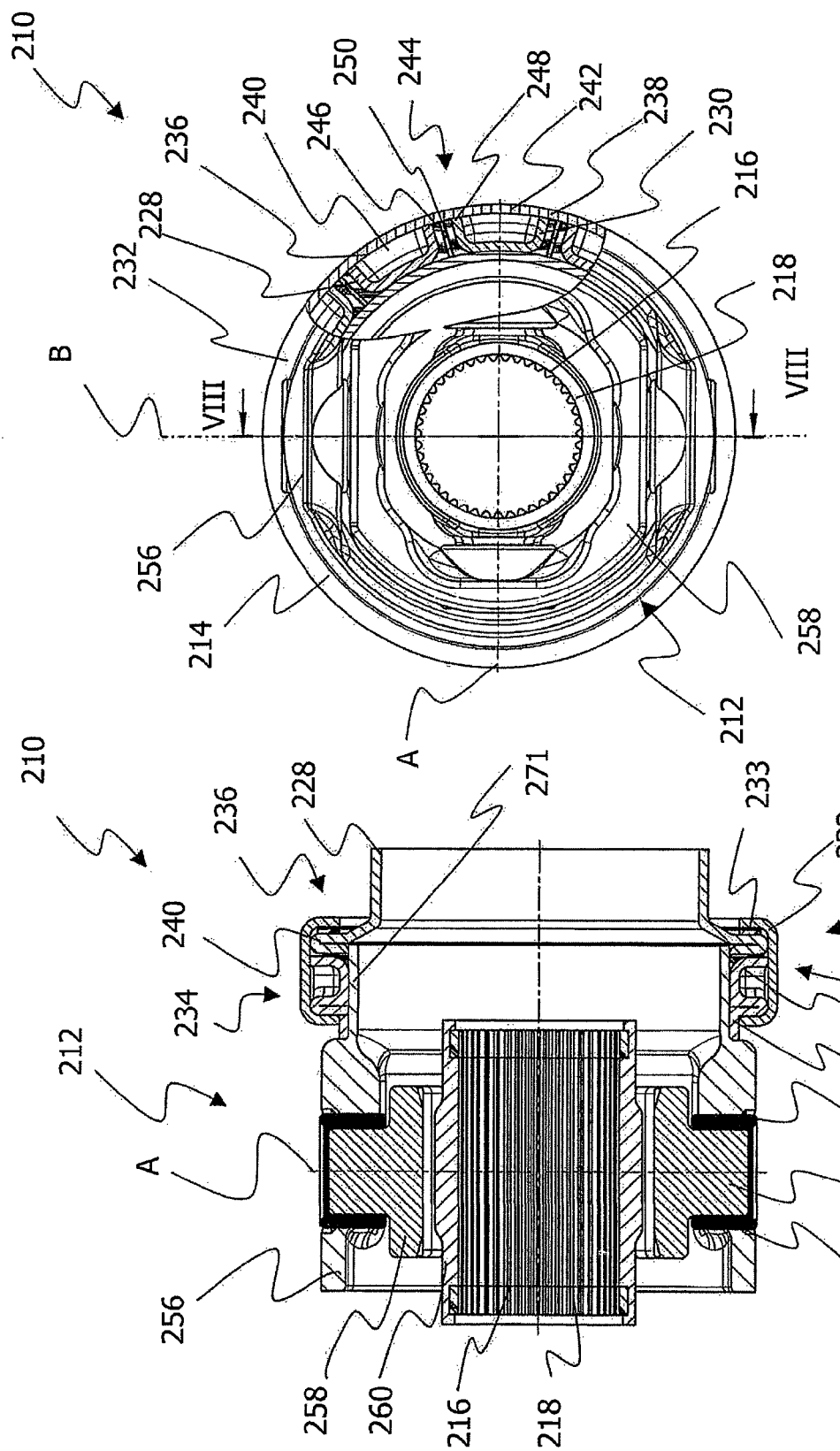
FIG. 8 a partially broken-open front view of the torque transmitting device according to the third embodiment of the invention.
FIG. 9 a sectional view along the cutting line VIII-VIII of FIG. 8.

FIG. 8 shows a partially broken-open front view of the torque transmitting device 210. FIG. 8 once again shows that the bearing openings in the joint fork 256 and the bearing bolts 264 of the intermediate element 258 define a first joint axis A. It is evident from FIG. 8 that the bearing openings 266 of the intermediate element 258 and the bearing bolts 268 of the joint inner part 260 define a second joint axis B. The two joint axes A, B extend through the intermediate element 258 and cross one another. By means of the two joint axes A, B the basic function of the universal joint 212 is achieved, namely the transmission of torques between shaft sections that extend at an angle to one another, i.e. a torque transmission under cardanic stresses.

In the broken-open part of FIG. 8 the vibration damping unit 214 may be seen, which is of an identical construction to the vibration damping unit according to the first two embodiments.

FIG. 9 shows a sectional view along the cutting line VIII-VIII of FIG. 8. It is therefore possible in FIG. 9 to see again the joint fork 256 with the bearing openings 262 as well as the intermediate element 258 with the bearing bolts 264, which form the joint axis A. From FIG. 9 it is further evident that bearing bushes 270 are disposed on the bearing opening/bearing bolt pairs, of which only the pair 262 and 264 is shown here. By means of the bearing bushes 270 frictional effects between the bearing openings 262, 266 and the bearing bolts 264, 268 are avoided.

FIG. 9 further shows that the location opening 216 in the joint inner part 260 is configured in the form of a through-bore. In the location opening 216 a shaft section (not shown) may be accommodated displaceably in the direction of a longitudinal axis. By virtue of the internal profiling and/or internal gearing 218 and external profiling formed on a shaft section (not shown here) a torque may be transmitted by means of a positive engagement between the internal gearing 218 and the external gearing corresponding thereto on one of the shaft sections. In other words, the internal gearing 218 enables an axially displaceable accommodation of the shaft section in the location opening 216 and at the same time a torque transmission as a result of a positive engagement between the internal gearing 218 and external gearing corresponding thereto on one of the shaft sections.

In FIG. 9 it may be seen that on one end of the joint fork 256 of the universal joint 212 an axial end portion 271 is formed, on which the vibration damping unit 214 is disposed.

From looking at and comparing FIGS. 8 and 9 it becomes clear that the transmitting device 214, as in the first two embodiments according to FIGS. 1 to 6, comprises two transmission parts 228 and 230, which overlap in a transmission area 234 and engage in one another for torque transmission. In FIG. 8 the segment sections 240 of the segment formation 236 of the transmission part 228 as well as the segment section 242 of the segment formation 238 of the transmission part 230 may be seen. Provided between the segment sections 240, 242 and/or between the segment formations 236 and 238 is a damper arrangement 244, which is formed by two rubber layers 246, 248 surrounding the segment formations 236, 238 and by a further material layer 250, in particular of plastics material, disposed between these two rubber layers 246 and 248.

The transmission part 230 is connected in a rotationally fixed manner to the axial end portion 271 of the universal joint 212. During operation of the torque transmitting device 210 one of the transmission parts 228 or 230 is driven by a shaft section and transmits the torque with simultaneous deformation of the damper arrangement 244 to the respective other transmission part 228 or 230 and hence also via the universal joint 212. The damper arrangement 244 prevents torsional vibrations and vibrations that arise in a drive train in a motor vehicle from being transmitted as structure-borne noise through the vehicle or to other components in the drive train. With the damper arrangement 244 it is possible to adjust a progressive damping characteristic, i.e. the higher the torques to be transmitted are, the more the damper arrangement 244 is compressed, with the result that high torques may be transmitted almost without loss between the two transmission parts 228 and 230.

Figure 10:
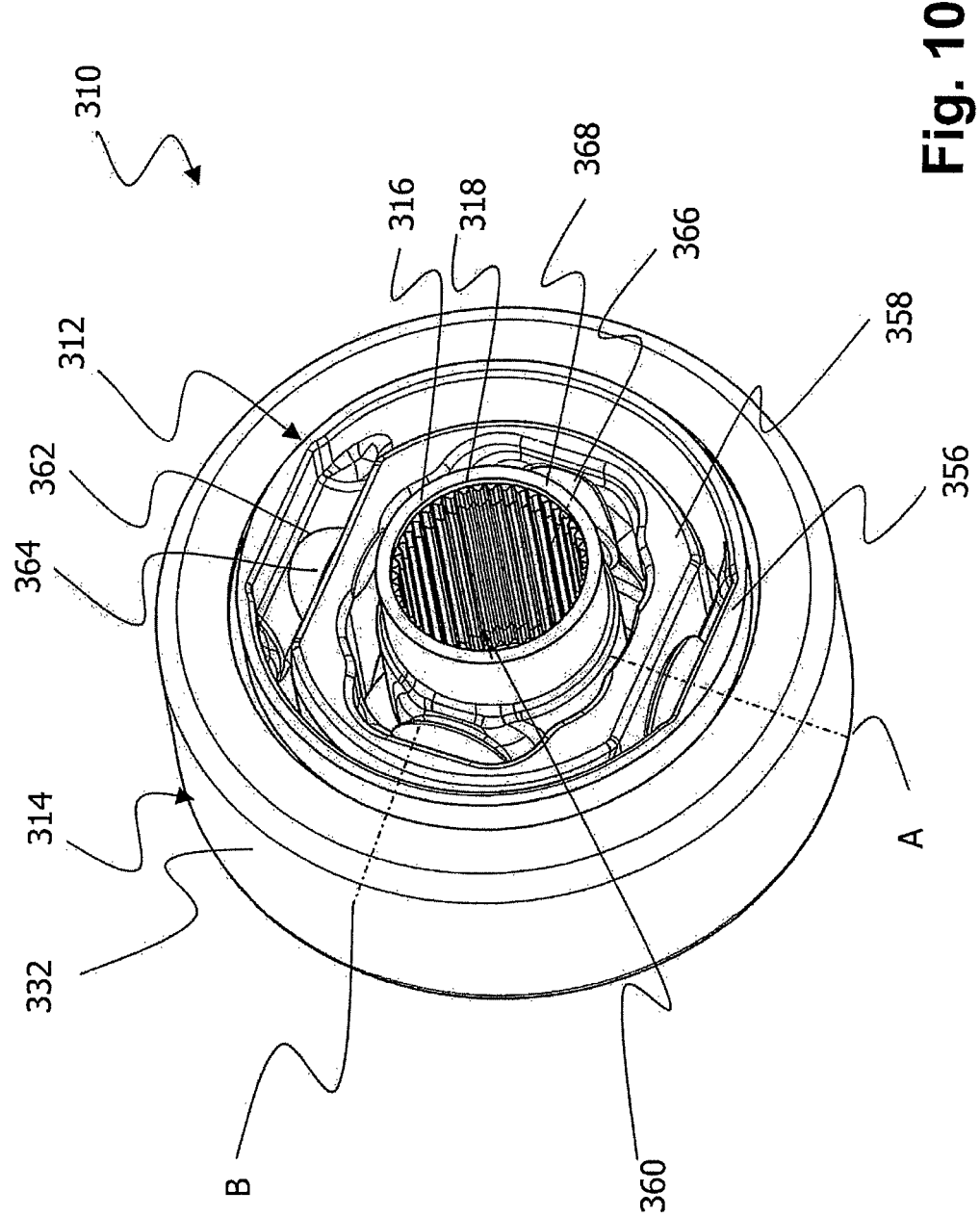
FIG. 10 a perspective view of a torque transmitting device according to a fourth embodiment of the invention.

FIG. 10 shows a perspective view of the torque transmitting device 310. As is evident from FIG. 10, the articulated arrangement 312 according to the fourth embodiment is formed likewise by a universal joint, but the vibration damping arrangement 314 in the fourth embodiment of the invention is mounted directly on the outer circumference of the universal joint 312, with the result that the axial length is considerably shorter than in the embodiment according to FIGS. 7 to 9.

FIG. 11 shows a partially broken-open front view of the torque transmitting device 310 comprising the universal joint 312 and the vibration damping unit 314, and FIG. 12 shows a sectional view along the cutting line XI-XI of FIG. 11.

From looking at and comparing FIGS. 11 and 12 it is evident that the vibration damping unit 314 is disposed directly on the outer circumference of the joint fork 356 of the universal joint 312 and connected in a rotationally fixed manner to the joint fork 356. In other words, the vibration damping unit 314 lies at least partially in a plane that is defined by the joint axes A, B of the universal joint 312.

From FIGS. 11 and 12 it is further evident that the transmission part 328 surrounds the transmission part 330, i.e. is disposed radially outside of and around the trans-mission part 330. The transmission part 330 is connected in a rotationally fixed manner to the joint fork 356 of the universal joint 312 and, as radially inner trans-mission part 330, is enclosed by the radially outer transmission part 330 in the transmission area 334.

FIG. 11 shows that the transmission part 328 comprises a segment formation 336 having inwardly oriented segment sections 340, whereas the transmission part 330, which is disposed on the joint fork 356, comprises a segment formation 338 having radially outwardly oriented segment sections 342. Between the segment formations 336 and 338 a damper arrangement 344 is again disposed, which in addition to the damping material layers 346 and 348 surrounding the segment formations comprises a further material layer 350 disposed between these two layers.

FIG. 13 shows a perspective view of the torque transmitting device 410 comprising an articulated arrangement 412 and a vibration damping unit 414, which is disposed on the outer circumference of the fixed ball joint 412 and surrounded by a housing 432.

FIG. 14 shows a perspective view of the torque transmitting device 410 with the vibration damping unit 414 without the housing 432.

From FIG. 14 the individual segment sections 440 and 442 of the segment formations 436 and 438 of the transmission parts 428, 430 are evident (for the sake of clarity the reference characters of the transmission parts and segment formations are omitted in FIG. 14). A loop 472 is wrapped around pairs of the neighbouring segment sections 440 and 442 of the transmission parts 428, 430. Each segment section 440 and 442 has two projections 474 and 476, wherein in each case the loop 472 is wrapped around the projection 476 of the segment section 442 together with the projection 474 of the segment section 440. Here, it is again conceivable for the housing part 424 and the transmission part 430 to be designed as one part, for example in the form of a part manufactured by forging.

Figure 15:
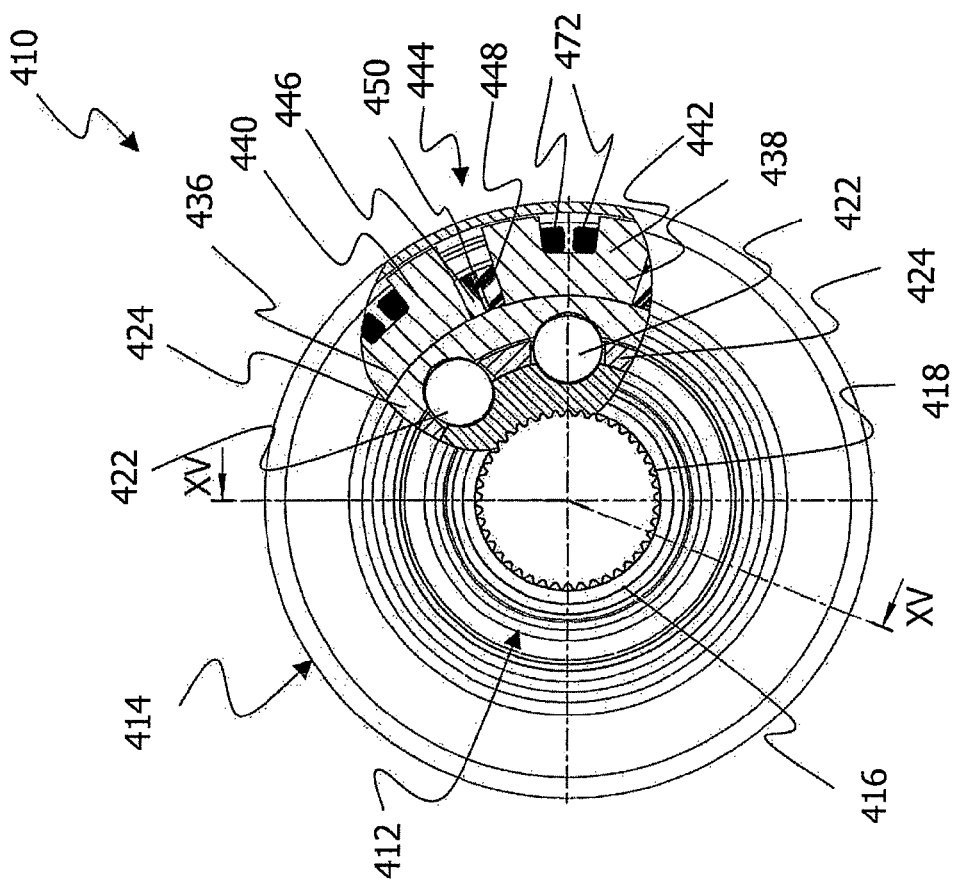
FIG. 15 a partially broken-open front view of the torque transmitting device according to the fifth embodiment.

FIG. 15 shows a partially broken-open front view of the torque transmitting device 410. In FIG. 15 it is again possible to see the segment sections 440 and 442, which comprise in each case two projections (for the sake of clarity the reference numerals are omitted in FIG. 15), wherein a loop 472 is wrapped around the projection of the segment section 440 and the projection of the segment section 442.

Figure 16:
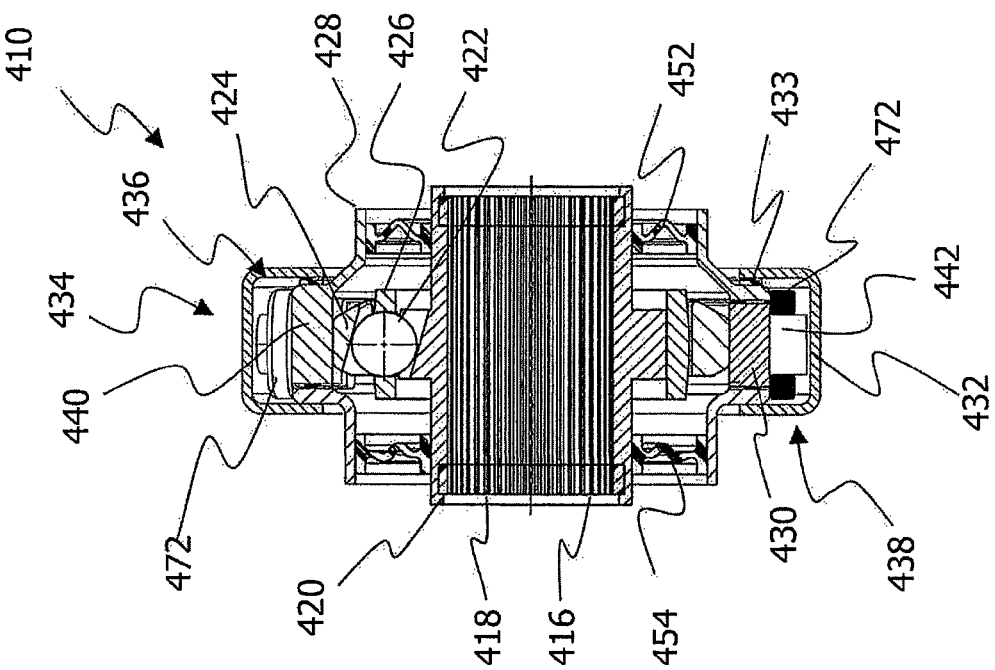
FIG. 16 a sectional view along the cutting line XV-XV of FIG. 15.

FIG. 16 shows a sectional view along the cutting line XV-XV of FIG. 15. Here too, the loops 472 that connect two successive neighbouring segment sections to one another may be seen. The segment sections 440 of the transmission part 428 may, during a transmission of torques, be displaced relative to the segment sections 442 of the transmission part 430 that are mounted in a fixed manner on the housing part 424.

By looking at and comparing FIGS. 15 and 16 it becomes clear that between the segment sections 440 and 442 connected by a loop 472 a damper arrangement 444 is provided, which comprises two damping material layers 446 and 448, wherein a further material layer 450 is disposed between these two layers 446 and 448.

During operation of the torque transmitting device 410 according to the fifth embodiment of the invention, the segment sections 440 of the transmission part 428 may be displaced relative to the segment sections 442 of the transmission part 430 that are mounted in a rotationally fixed manner on the housing part 424, with simultaneous elastic deformation of the loops 472 and the damper arrangement 444. In other words, a torque is transmitted between the two transmission parts 428 and 430 via the loops 472 and the damper arrangements 444, i.e. from the driven trans-mission part 428 to the transmission part 430. The loops 472 are therefore preferably manufactured from an elastomer with a thread insert. The torque transmission is effected accordingly by means of a tensile force, which is transmitted from the transmission part 428 and/or the segment section 440 via the loop 472 to the segment section 442 of the transmission part, and a compressive force, which is transmitted from the transmission part 428 and/or the segment section 440 via the damping arrangement 444 to the segment section 442 of the transmission part 430.

Figure 17:
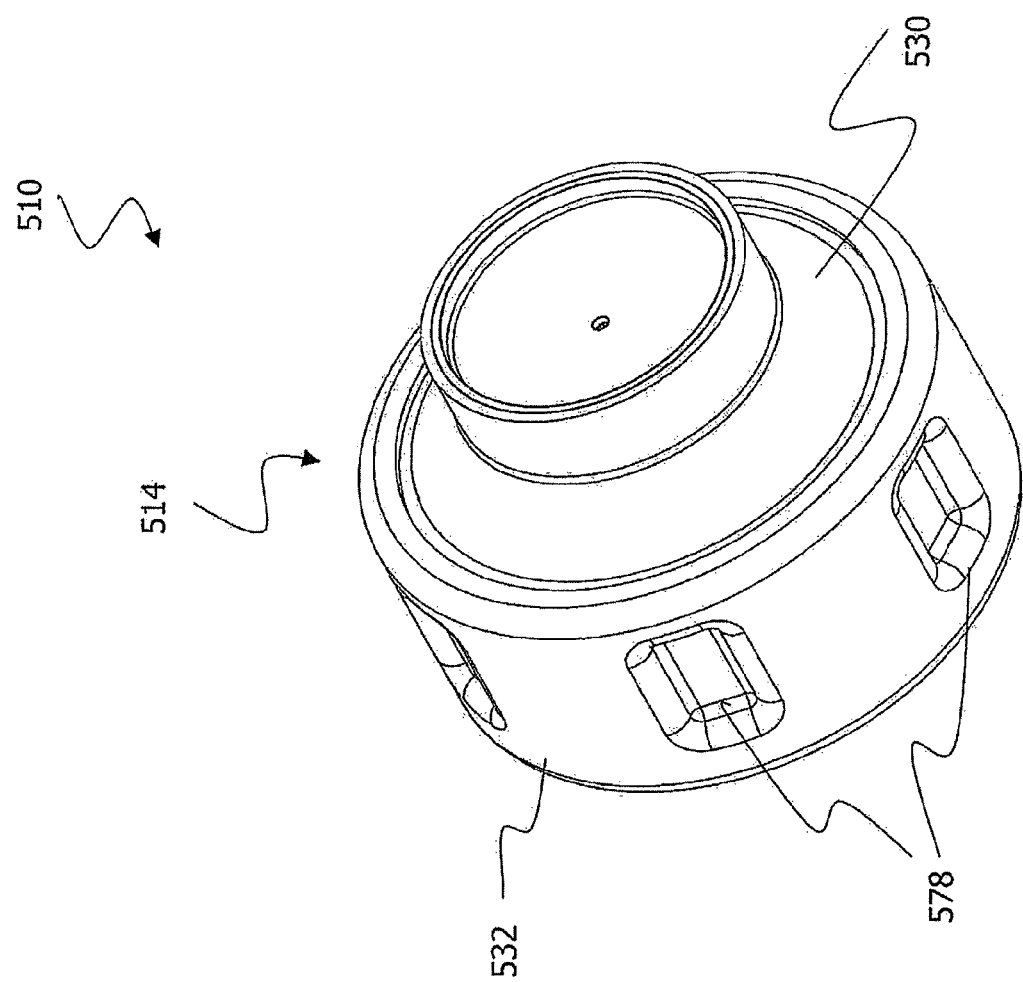
FIG. 17 a perspective view of the torque transmitting device according to a sixth embodiment of the invention.

FIG. 17 shows a perspective view of the torque transmission device 510 according to a sixth embodiment of the invention. In FIG. 17 it is again possible to see the vibration damping arrangement 514 that is mounted on the articulated arrangement 512—here in the form of a fixed ball joint. The housing 532 according to this embodiment of the invention has beads 578. The housing 532 is connected by the beads 578 to the transmission part 530, thereby further stiffening the transmission part 530.

FIG. 18 shows a partially broken-open front view of the torque transmitting device 510 according to the sixth embodiment of the invention, and FIG. 19 shows a sectional view along the cutting line XVIII-XVIII of FIG. 18.

From looking at and comparing FIGS. 18 and 19 it is again evident that the articulated arrangement 512 is configured in the form of a fixed ball joint, on the outer circumference of which in radial direction the vibration damping unit 514 is disposed.

The sixth embodiment of the invention differs from the embodiments described with reference to FIGS. 1 to 6 substantially in that the housing part 524 of the fixed ball joint 512 is formed integrally with the transmission part 528, i.e. the housing part 524 of the fixed ball joint 512 and the transmission part are manufactured from one part.

A further difference from the previously described embodiments is that the housing 532 is connected by beads 587 in the housing 532 to the transmission part 530 and stiffens the transmission part 530.

The method of functioning of the torque transmitting device 510 corresponds to the functioning of the embodiments described with reference to FIGS. 1 to 6.

Figure 20:
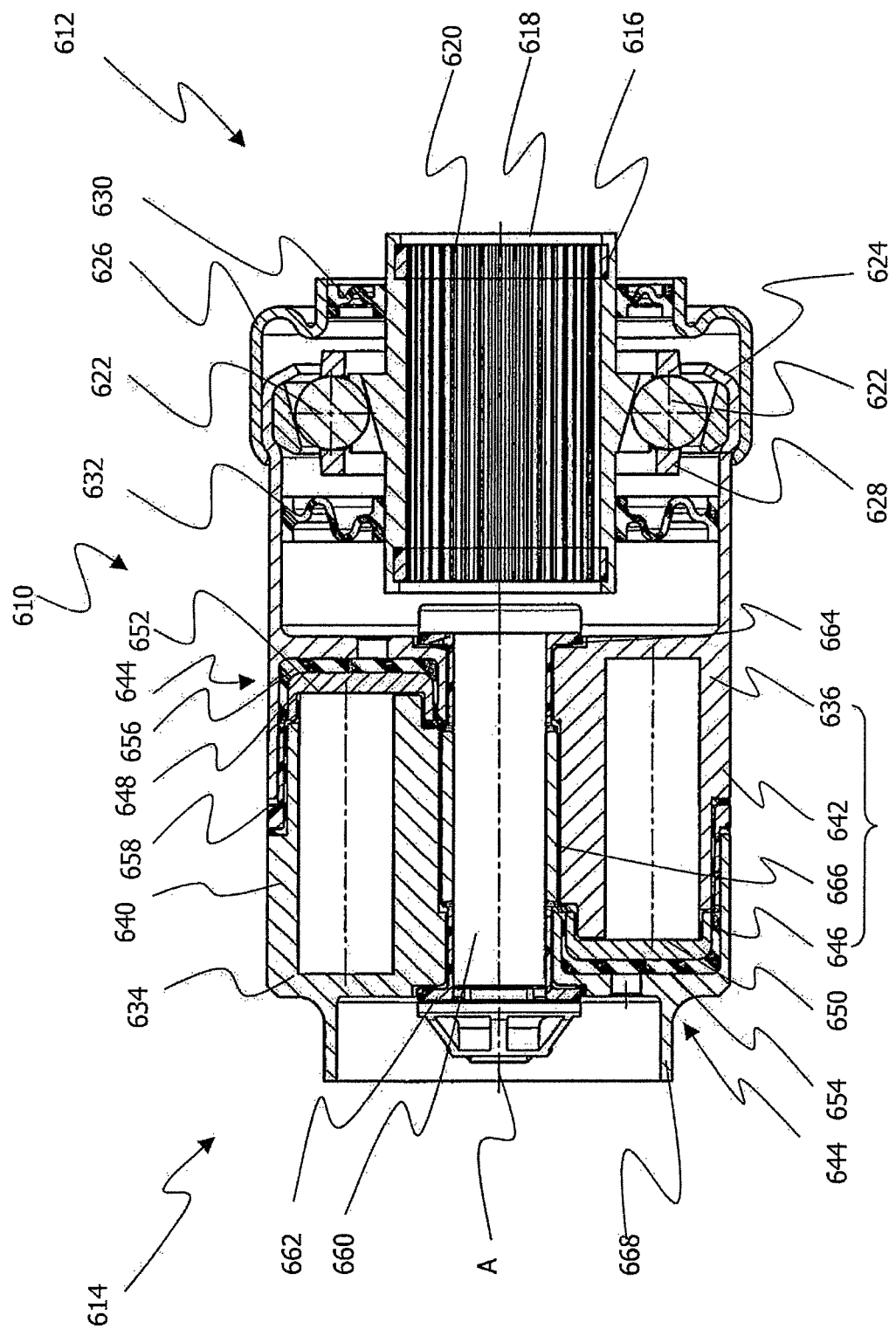
FIG. 20 an axis-containing sectional view of a seventh embodiment of the torque transmitting device.

FIG. 20 shows an axis-containing sectional view of the torque transmitting device 610 according to a seventh embodiment of the invention. From FIG. 20 the fixed ball joint 612 and the transmission device 614 are evident. The fixed ball joint 612 has an internal hub 616 in the form of a ball star, in which a location opening 618 in the form of a through-bore is provided. In the through-bore 618 internal profiling 620, preferably in the form of internal gearing, is formed. The internal gearing is manufactured preferably by broaching or milling, i.e. by means of low-cost but highprecision operations. The ball star 616 is coupled by the balls 622 in a torque-transmitting manner to the housing part 624. The housing part 626 is in turn press-fitted onto the housing part 624 and partially surrounds the housing part 624. By means of the balls guided in a cage 628 angular offsets of up to 40° between two shaft sections to be connected may be compensated. Between the housing parts 624, 626 and the ball star 616 shielding elements 630 and 632 made of rubber are provided, which are to prevent lubricant residues or particles possibly abraded by friction from being able to penetrate into the fixed ball joint 612 or migrate from the fixed ball joint 612 into the transmitting device 614.

It is further evident from FIG. 20 that the torque transmitting device 614 comprises a first transmission part 634 and a second transmission part 636. The two transmission parts 634 and 636 overlap in a coupling area 638, wherein they have corresponding claw formations 640 and 642 in this coupling area 638. The claw formations 640 and 642 of the transmission parts 634 and 636 project in axial direction. In the coupling area 638 the two transmission parts 634 and 636 are coated in each case with a rubber layer, which is not shown here. The two rubber layers form a first damper device that is subject to compressive stress.

Besides the first damper device that is subject to compressive stress, a second pre-damper device 644 that may be subject to torsional stress is provided on the transmitting device 614. For transmitting torques to the pre-damper device 644 receiving shells 646 and 648 are disposed, which correspond with the claws of the claw form ations 640, 642 and receive these positively with their location openings 650 and 652. The number of receiving shells 650, 652 corresponds to the number of claws of the claw formations 640, 642. The receiving shells 646, 648 are each connected by a rubber layer 654, 656, i.e. vulcanized, to one of the transmission parts 634, 636.

A guide sleeve 658 for guiding the transmission parts 634, 636 is disposed in the circumferential region thereof.

Disposed in the central area of the torque transmitting device 614 is a positioning pin 660, the longitudinal axis of which is substantially flush with the longitudinal axis A. The positioning pin 660 is used to align the first transmission part 634 relative to the second transmission part 636. The transmission parts 634, 636 are supported via bearing bushes 662 and 664 on the positioning pin 660. Between the bearing bushes 663 and 664 a central positioning sleeve 666 is further provided, which is to enable a bearing arrangement of the transmission parts 634 and 636 on the positioning pin 660 that is as low-friction as possible.

The transmission part 636 of the transmitting device 614 is connected in a fixed manner to the housing part 624 of the fixed ball joint or may be formed integrally therewith, with the result that the fixed ball joint 612 is connected in a rotationally fixed manner to the transmitting device 614. A tube-like section 668 on the trans-mission part 34 of the transmitting device 614 may be connected in a fixed manner, preferably welded, to one of the shaft sections.

There now follows a detailed functional description of the torque transmitting device 610.

In the location opening 618 having the internal profiling and/or internal gearing 620 a shaft section (not shown here) having external gearing corresponding to the internal gearing 620 is accommodated in an axially displaceable manner, whereas the other shaft section is connected in a fixed manner to the transmission part 634. By means of the fixed ball joint and/or the torque-transmitting coupling of the ball star 616 by means of the balls 622 to the housing part 624, torques may be transmitted via the two shaft sections, which possibly extend at an angle to one another. During operation, by means of a positive engagement between the internal gearing 620 and the external gearing torques are transmitted. At the same time this connection between internal gearing 620 in the location opening 618 and the corresponding external gearing enables, in addition to the torque transmission, the compensation of axial aggregate movements by means of the shaft section that is displaceable in the location opening 618. These aggregate movements therefore do not act upon the transmitting device 14 and the fixed ball joint 612 itself or upon the components lying downstream in a drive train. The transmitting device 14 damps the vibrations and torsional vibrations arising in a drive train sufficiently to prevent a structure-borne noise that arises at the input axle from being transmitted through the vehicle.

What is claimed is:

1. A torque transmitting device for transmitting torques between two shaft sections of a shaft arrangement by way of an articulated arrangement, wherein the articulated arrangement is designed to compensate for an angular offset between the shaft sections, the torque transmitting device comprising:

a vibration damping unit for damping torsional vibrations, said unit having at least two transmission parts, wherein one of the transmission parts is assigned to one of the shaft sections and the other transmission part is assigned to the articulated arrangement, and wherein the transmission parts each have segment formations with radial segment sections, which interact in a torque-transmitting manner with one another in a transmission area, wherein at least one damper arrangement that is substantially subject to compressive stress is provided between neighbouring segment sections in the transmission area, wherein two neighbouring radial segment sections, of which one is assigned to the one transmission part and the other segment section is assigned to the other transmission part, are connected to one another, and wherein the neighbouring segment sections are connected in pairs by means of at least one deformable loop.

2. The torque transmitting device according to claim 1, wherein the segment formations of the at least two transmission parts may be brought into engagement with one another in radial direction for torque transmission.

3. The torque transmitting device according to claim 1, wherein the segment sections of the segment formations have at least two projections, around which in each case a loop is wrapped to connect one of the segment sections to a neighbouring segment section of the segment formations.

4. The torque transmitting device according to claim 1, wherein the loop is manufactured from rubber and/or a thread layer.

5. The torque transmitting device according to claim 1, wherein the articulated arrangement is a fixed ball joint.

6. The torque transmitting device according to claim 5, wherein the vibration damping unit is connected in a rotationally fixed manner to a housing part of the fixed ball joint.

\* \* \* \* \*